United States Patent
Ladie' et al.

(10) Patent No.: US 6,730,851 B2
(45) Date of Patent: May 4, 2004

(54) SUPERCONDUCTING CABLE AND CURRENT TRANSMISSION AND/OR DISTRIBUTION NETWORK INCLUDING THE SUPERCONDUCTING CABLE

(75) Inventors: Pierluigi Ladie', Milan (IT); Paola Caracino, Milan (IT); Marco Nassi, Turin (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/970,653

(22) Filed: Oct. 5, 2001

(65) Prior Publication Data

US 2002/0098985 A1 Jul. 25, 2002

Related U.S. Application Data

(60) Provisional application No. 60/239,927, filed on Oct. 13, 2000.

(30) Foreign Application Priority Data

Oct. 6, 2000 (EP) ............................................. 00121805

(51) Int. Cl.⁷ ................................................ H01B 12/00
(52) U.S. Cl. ...................... 174/125.1; 29/599; 505/230; 505/885
(58) Field of Search ............................ 174/125.1, 15.4, 174/15.5; 29/595; 505/230, 885

(56) References Cited

U.S. PATENT DOCUMENTS

| | | | |
|---|---|---|---|
| 3,502,783 A | | 3/1970 | Aupoix et al. |
| 3,612,742 A | * | 10/1971 | Snowden et al. ........... 174/15.5 |
| 3,730,966 A | * | 5/1973 | Aupoix et al. .............. 174/15.5 |
| 3,992,169 A | * | 11/1976 | Loudon ........................ 62/50.7 |
| 4,036,618 A | * | 7/1977 | Leonard et al. ............... 62/50.7 |
| 4,039,740 A | * | 8/1977 | Iwata .......................... 174/15.5 |
| 4,184,042 A | * | 1/1980 | Vulis et al. .................. 174/15.5 |
| 4,394,534 A | * | 7/1983 | Bahder et al. ............... 174/15.5 |
| 4,845,308 A | * | 7/1989 | Womack et al. ........... 174/15.4 |
| 4,966,886 A | | 10/1990 | Hoshiko |
| 5,678,724 A | * | 10/1997 | Boffito et al. ................ 138/149 |
| 5,741,377 A | | 4/1998 | Goyal et al. |
| 6,110,606 A | | 8/2000 | Scudiere et al. |

FOREIGN PATENT DOCUMENTS

| | | |
|---|---|---|
| EP | 0 297 061 B1 | 12/1988 |
| EP | 0 412 442 A2 | 2/1991 |
| EP | 0 747 975 A1 | 12/1996 |
| EP | 0 786 783 A1 | 7/1997 |
| JP | 411043610 A * | 2/1999 |
| WO | WO98/09004 | 3/1998 |

OTHER PUBLICATIONS

J.S. Engelhardt, et al., "Application Considerations for HTSC Power Transmission Cables", Fifth Annual Conference on Superconductivity and Applications, pp. 1–20, (1991).

P.D. Porta, "Gettering an Integral Part of Vacuum Technology", American Vacuum /Society, pp. 1–12.

* cited by examiner

Primary Examiner—Evan Pert
Assistant Examiner—I B Patel
(74) Attorney, Agent, or Firm—Finnegan, Henderson, Farabow, Garrett & Dunner, L.L.P.

(57) ABSTRACT

A superconducting cable includes a cryogenic fluid, a superconducting conductor, and a cryostat. A layer impervious to the cryogenic fluid is provided between the superconducting conductor and the cryogenic fluid. The superconducting conductor operates in a space substantially free from fluids liquefying at a temperature greater than or equal to an operative temperature of the superconducting cable. A method for protecting a superconducting cable from formation of balloons includes isolating the superconducting conductor from the cryogenic fluid using a layer impervious to the cryogenic fluid and operating the superconducting conductor in a space substantially free from fluids liquefying at a temperature greater than or equal to an operative temperature of the superconducting cable. A current transmission/distribution network including at least one of the superconducting cables is also disclosed.

70 Claims, 8 Drawing Sheets

SUPERCONDUCTING CABLE AND CURRENT TRANSMISSION AND/OR DISTRIBUTION NETWORK INCLUDING THE SUPERCONDUCTING CABLE

CROSS REFERENCE TO RELATED APPLICATIONS

Applicants claim the right of priority under 35 U.S.C. §119(a)–(d) based on patent application No. 00121805.6, filed Oct. 6, 2000, in the European Patent Office; additionally, Applicants claim the benefit under 35 U.S.C. §119(e) based on provisional application No. 60/239,927, filed Oct. 13, 2000, in the U.S. Patent and Trademark Office, the contents of which are incorporated herein by reference.

BACKGROUND OF THE INVENTION

1. Field of the Invention

In a general aspect, the present invention relates to a superconducting cable comprising a cryogenic fluid, a superconducting conductor and a cryostat.

More particularly, the invention relates to a superconducting cable comprising a cryogenic fluid, a superconducting conductor and a cryostat wherein the cryogenic fluid cannot reach a direct contact with the superconducting material.

2. Description of the Related Art

The term "superconducting cable" encompasses any cable to be used to transmit current in conditions of so-called superconductivity, i.e. in conditions of almost null electric resistance. See, for example, Engelhardt J. S. et al., Application Consideration for HTSC Power Transmission Cable, $5^{th}$ Annual Conference on Superconductivity and Application, Buffalo, N.Y., Sep. 24–26, 1991.

The term "superconducting conductor" indicates in the following any element capable of transmitting electric current in superconductivity conditions. An example would include a layer of superconducting material supported by a tubular core. Another example would include tapes of superconducting material partially or totally surrounded by a noble metal pipe, which are wound on a supporting core.

The term "superconducting material" or "superconductor" indicates a material such as, for example, special ceramics based on mixed oxides of copper, barium, and yttrium (usually called YBCO); of bismuth, lead, strontium, calcium, and copper (usually called BSCCO); or of thallium or mercury and barium, calcium, and copper, comprising a superconducting phase having a substantially-null resistivity under a given temperature, defined as the critical temperature or $T_c$. For example, for the above-mentioned materials, the $T_c$ ranges from about 80 K (−193° C. to about 150 K (−123° C).

Usually, the superconducting material, particularly the BSCCO material, is produced and used in the form of mono- or multi-superconductor element tapes. The material is surrounded by a metal, generally silver, optionally with aluminum or magnesium added.

The operative temperature of a superconductive cable is lower than the $T_c$ of the superconductive material present therein.

In view of this the superconducting cables are provided with at least one channel for the flow of the cryogen. The cryogen is typically liquid helium, liquid nitrogen, liquid hydrogen and/or liquid argon, operating at temperature and pressure specific for the application.

The term "operative temperature" indicates in the following the temperature at which the superconducting cable transmit electric current in superconductivity conditions. Specifically such temperature is lower than the $T_c$.

For maintaining the superconducting material at the operative temperature a close contact between the superconducting material and the cryogen is generally recommended. See, for example, EP-A-0 786 783 (in the Applicant's name) wherein the cryogen is said to flow both in the inside of the conductive elements and in the interstices between such elements and the tubular shell. U.S. Pat. No. 4,966,886 (in the name of Junkosha Co., Ltd) discloses a cable wherein the liquid nitrogen penetrates into the crystalline arrangement of the superconducting ceramic and is effectively absorbed to yield a stabilised superconducting cable. Analogously, EP-A-0 412 442 (in the name of Sumitomo Electric Industries, Ltd.) discloses a pipe supporting the superconducting tapes and defining the cooling space, said pipe being provided with holes in order to increase the efficiency of the cooling.

EP-B-0 297 061 (in the name of Saes Getters S.p.A.) discloses a vacuum insulated superconducting electrical conductor employing a getter device. More specifically, this document claims an electrical conductor wherein a thermally insulating evacuated space surrounds the superconducting elements and the liquid nitrogen. Said evacuated space takes the place of the cryostat which is absent in the cable described in the above patent.

WO 98/09004 (in the name of American Superconductor Corporation) discloses that the infiltration of cryogenic liquid into the porous ceramic structure of the superconducting material is detrimental for the integrity of the conductor. In fact, when the article is rapidly heated, the cryogenic liquid entrapped in the interstices of the ceramic material quickly expands, thus creating "balloons" in the matrix and damaging the intragrain bonds thereof. This causes a decrease of the mechanical strength and current carrying capacity of the article. According to said patent application, it is known to "pot" certain superconducting articles with thick layers of epoxy resin for minimising the likelihood of contact between the liquid and the superconducting tape. Alternatively, when the article cannot be protected in such a way (the use of a heavy epoxy coating is considered not feasible because of a number of reasons such as packing factor and flexibility requirements) other cooling means, such as conductive cooling are used. Nevertheless, it is said that the cooling by conduction is not deemed adequate for applications such as transmitting cables. This patent application proposes to solve the "balloon" problem by a superconducting conductor wherein the superconducting ceramic tape has at least one surface, which is vulnerable to cryogenic infiltration, sealed to a non-porous metal laminate impervious to said infiltration. In particular, the metal is stainless steel, copper, copper alloy, or superalloys.

SUMMARY OF THE INVENTION

The Applicant has found that the "balloon" phenomenon does not only occur due to cryogenic fluid leaking from the flowing channel into the superconducting tape area. Actually any kind of fluid directly in contact with the superconductor may liquefy at a temperature equal or higher than the operative temperature of the cable and penetrate into the superconductor. When the temperature of the article rapidly increases, for example when the cable is brought to room temperature for maintenance operations, such a liquefied fluid will abruptly turn into gaseous status, thus expanding its volume and consequently damaging the superconductor according to the "balloon" effect discussed above.

Moreover, in the Applicant's view, the prior art technique of individually protecting each tape to prevent the "balloon" formation, which implies the production of superconducting cables provided with this specific kind of tapes, is economically inconvenient as further material (stainless steel, copper, copper alloy, or superalloys) and further processing steps (lamination and sealing) are necessary.

It has been found that the "balloon" effect damaging the superconducting material can be effectively eliminated by providing a layer of material impervious to the cryogenic fluid. The layer of material can be added between the superconducting conductor and the fluid flow. This addition causes the superconducting material to operate in a space free from fluids that liquefy at a temperature equal to or higher than the operative temperature of the superconducting material.

Therefore, the present invention relates to a superconducting cable that comprises a cryogenic fluid, a superconducting conductor, and a cryostat. Further, a layer impervious to the cryogenic fluid is provided between the superconducting conductor and the cryogenic fluid. This permits the superconducting conductor to operate in a space substantially free from fluids that liquefy at a temperature equal to or higher than the operative temperature of the superconducting cable.

The superconducting cable of the present invention may be a warm dielectric (WD) or cold dielectric (CD) cable. See, for example, Engelhardt J. S. et al. supra, FIG. 5 for a WD cable, and FIG. 6 for a CD cable.

A WD cable generally comprises superconducting tapes wound on a support, typically tubular, defining the cryogen fluid flow channel. Externally to the superconducting tapes a cryostat and an electric insulation are provided.

A CD cable generally comprises, in addition to the conductor mentioned above for the WD cable, a further superconducting conductor, called return conductor, wound externally to the electric insulation and surrounded by a layer partially defining a second cryogen fluid flow channel.

In the case of the CD cable, both of the superconducting phases may be contacted by said impervious material in the direction of the cryogenic fluid, and both of them may be in a space free from fluids liquefying at a temperature equal or higher than the operative temperature.

The layer impervious to the cryogenic fluid, provided between the super-conducting conductor and the cryogenic fluid is made from a material having a thermal conductivity so as to allow a thermal flow between the cryogenic fluid and the superconducting conductor sufficient to achieve an effective cooling of the superconducting material when the cable operates. Preferably, said material has a thermal conductivity higher than 1 W/m K at 70 K, even more preferably equal or higher than 2 W/m K.

The impervious material, which constitutes per se a barrier to the cryogenic fluid, may be of a metal such as, for example, copper, steel or aluminium, or of a polymeric substance such as a fluorinated polyolefin (e.g. polytetrafluoroethylene), a polyolefin (e.g. polyethylene), a polyamide (e.g. nylon) and the like.

The impervious layer may be in form of a tube, of a spiral contained in a metal tube, or of a plurality of adjacent tape-shaped elements spirally wound to form a tube and contained in a tube. Said tape-shaped elements may be made of the same or different materials, e.g. copper alternated by polytetrafluoroethylene.

The cooling performance of the cryogenic fluid depends not only on the thermal conductivity of the impervious layer, but also on its dimensions (for example, on the thickness and/or the diameter thereof, and, in the case, on the number of the superconducting tapes to be cooled.

Preferably, the inner diameter of the impervious layer is comprised between about 10 and about 50 mm, while the thickness is determined according to both the material (metal and/or polymer) and the kind of cable (WD or CD) and also, optionally, the number of overlapping layers of superconducting tapes.

When more layers of superconducting tapes are provided in the cable of the invention, it takes to evaluate the difference of temperatures ($\Delta T$) between the first layer, i.e. the nearest to the impervious layer, and the last one.

For example, 1 km of a cable comprising two layers of 24 BSCCO tapes each having a thickness of 0.3 mm wound on a copper tube as support and impervious layer having a thickness of 3.5 mm and an internal diameter or 38.7 mm, and carrying 2,600 A of A/C current was cooled with liquid nitrogen at 65 K at the inlet, resulting in a liquid nitrogen temperature of 84 K at the outlet.

The cryogenic fluid useful for the cable of the present invention may be any fluid having, at the operative condition, a transition temperature from liquid to gaseous state higher than the $T_c$ of the superconducting material, i.e. liquid helium, liquid nitrogen, liquid hydrogen and/or liquid argon. Preferably, the cable of the invention is cooled with liquid nitrogen at a temperature typically of from about 65 to about 90 K.

The superconducting material of the cable of the present invention may be, for example, an oxide of lanthanum and/or barium and/or strontium, copper (LaSCO) or of bismuth, lead, strontium, calcium, copper (BSCCO), or of yttrium (and/or other rare earth such as Nd, Sm, Eu, Gd), barium, copper (YBCO), or of thallium, barium (and/or strontium), calcium, copper, or of mercury, barium (and/or strontium), calcium, copper, or of lead, strontium, yttrium, copper.

The superconducting material of the invention may be produced by any of the methods known in the art, for example, by the oxide powder in tube (OPIT) method for the BSCCO, or by that described in U.S. Pat. No. 5,741,377 (in the name of Martin Marietta Corporation) for YBCO.

The tapes may also be mono- or multi-superconductor elements, as described in application EP 0,747,975 (in the Applicant's name).

The space free from fluids that liquefy at a temperature equal to or higher than the operative temperature provided for the superconducting cable of the present invention may be under a vacuum. Alternatively, an atmosphere of a fluid, that does not liquefy at a temperature equal to or higher than the operative temperature of the cable (e.g., a helium atmosphere), can be used for a cable having nitrogen as the cryogenic fluid. Preferably, the superconducting conductor is under vacuum. In this case, the superconducting area is preferably provided with getters, i.e., gas absorbers of sintered powder of, e.g., zirconium or titanium. See, for example, della Porta, P., "Gettering—an Integral Part of Vacuum Technology", American Vacuum Society, $39^{th}$ National Symposium (Technical paper TP 202).

The method for making the vacuum are those known to the skilled in that art, for example by vacuum pumps. The vacuum has a value of at least $10^{-4}$ bar, preferably $10^{-7}$ bar.

The cryogenic fluid remains confined into its flowing channel(s) and does not get in direct contact with the superconducting conductor. At the same time the superconducting material is anyway efficiently cooled.

In another aspect, the present invention relates to a method for protecting a superconducting cable, comprising a cryogenic fluid, a superconducting conductor, and a cryostat, from the formation of balloons. The cryostat isolates the superconducting conductor from the cryogenic fluid by a layer impervious to the cryogenic fluid. Furthermore, the superconducting conductor operates in a space free from fluids that liquefy at a temperature equal to or higher than the operative temperature of the cable.

According to a further aspect, the invention relates to a current transmission/distribution network comprising at least one superconducting cable comprising a cryogenic fluid, a superconducting conductor, and a cryostat. The cryostat includes a layer impervious to the cryogenic fluid between the superconducting conductor and the cryogenic fluid. The superconducting conductor is operated in a space free from fluids that liquefy at a temperature equal to or higher than the operative temperature of the conductor.

BRIEF DESCRIPTION OF THE DRAWING

Further features and advantages of the present invention will become more apparent from the following drawings reporting some of the preferred embodiments, which are non-limitative illustrations of the invention. Additionally, the cross-hatchings used in FIGS. 1A, 1B, 2, and 4–7 merely illustrate the materials that may be used in making the present invention. The cross-hatchings do not exclude the use of otherwise-acceptable materials.

In the drawings.

Figure 1A:
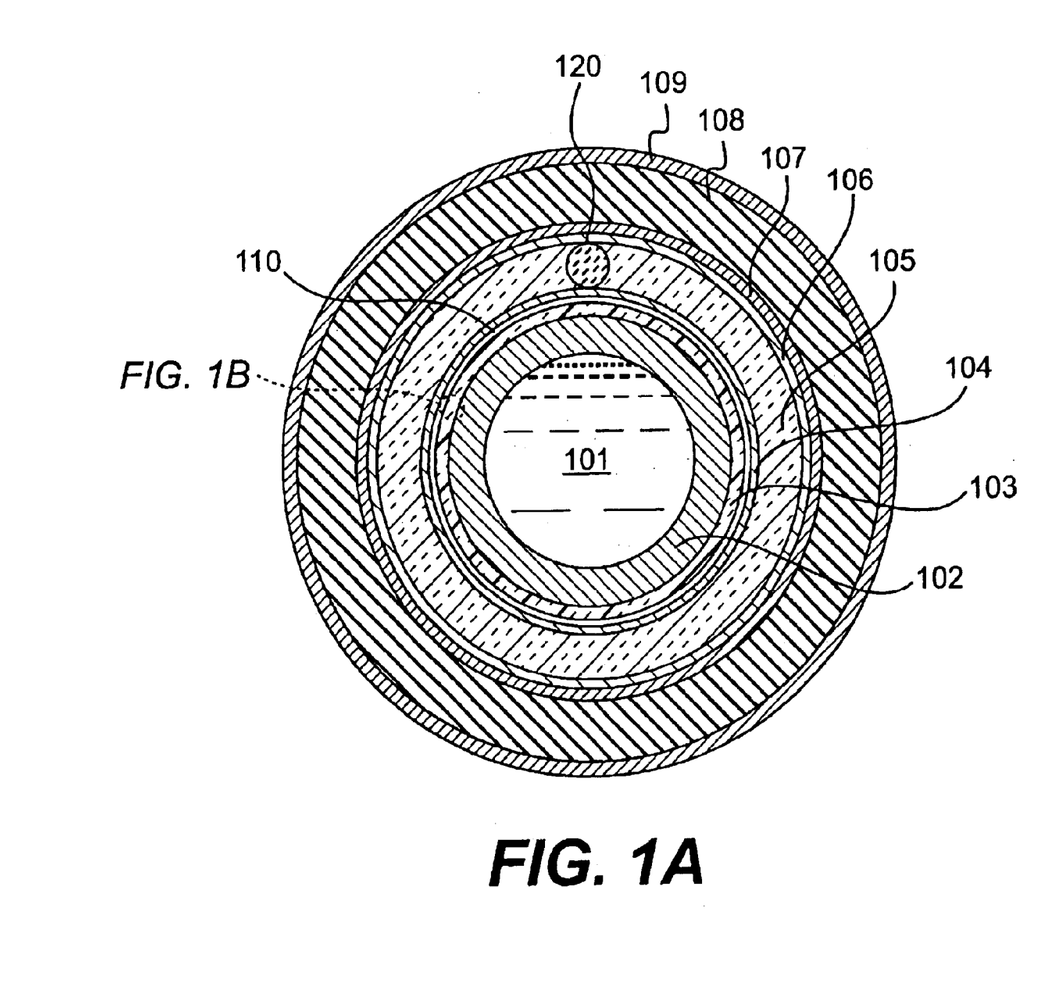
FIG. 1A shows a transversal section of a WD superconducting cable according to the invention.
Figure 1B:
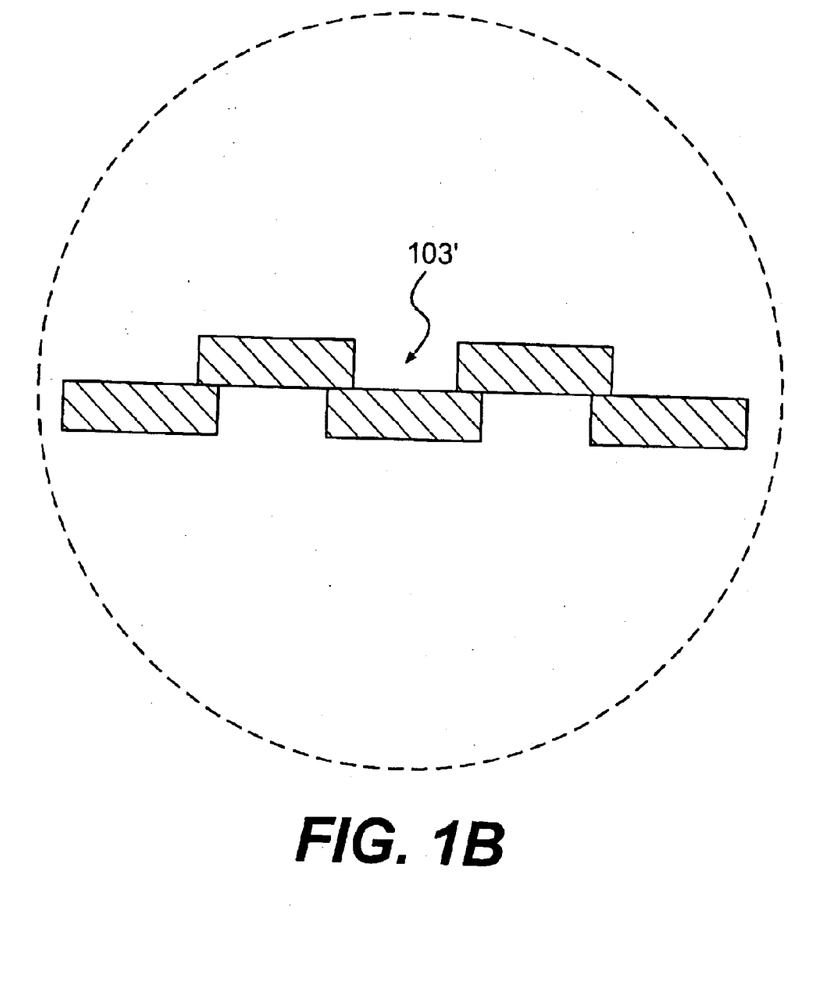
FIG. 1B shows a transversal section of the superconducting tapes according to the cable of FIG. 1A.

In detail, FIGS. 1A and 1B show a first specific embodiment of a WD superconducting cable (100) according to the present invention. The phase conductor (103) comprises a plurality of superconducting tapes (103') wound on a support (102) of thermally-conducting impervious material (102). The inner surface of the support (102) defines the pipe or channel (101) wherein the cryogenic fluid flows.

The impervious support (102) avoids any leaking of cryogenic fluid into the phase conductor (103). The phase conductor (103) is contained in a chamber (110), wherein the chamber (110) is free from fluids that liquefy at a temperature equal to or higher than the operative temperature of the superconducting cable (100).

For reducing as much as possible accidental mechanical internal stresses, the superconducting tapes (103') are preferably wound on the impervious support (102) with winding angles comprised between 10° and 60°, such angles being constant or variable for each layer.

The phase conductor (103) may be in direct contact with the support (102) or, alternatively, a layer of carbon black crepe paper may be interposed between (103) and (102) for minimising mechanical stress among the tapes.

The conductor phase (103) is thermally insulated by means of a cryostat coaxial to the conductor phase and comprising a first metal tube (104), a second metal tube (106), and a thermal insulation (105) interposed between said first and second tubes. Such cryostat is not in direct contact with the conductor phase (103), as its inner surface defines the chamber (110).

The metal tubes (104) and (106) are preferably made of a 0.6-mm thick stainless steel tape, more preferably corrugated.

The thermal insulation (105) consists, for example, of surface-metallized polyester resin tapes, known as "thermal superinsulation", loosely wound, possibly interposing spacers (120) for spacing the metal tubes (104) and (106).

Preferably, such spacers (120) are placed at 120° each other with respect to the cable section. Moreover they are preferably made of polytetrafluoroethylene.

At the moment of operating the cable, a vacuum of, typically, $10^{-7}$ bar is created in the thermal insulation by means of a vacuum apparatus.

A first electrostatic shield (107), an electric insulation (108) and a second electrostatic shield (109) are set externally to the cryostat. Said shields (107) and (109) and the insulation (108) may be lapped or extruded.

In case of lapped electrostatic shields, they may consist of insulating oil-impregnated tapes of various materials such as, for example, smooth or crêpe carbon paper and metallized carbon.

In case of a lapped electric insulation, it may consist of a plurality of layers made of, for example, paper tapes and/or paper with film-calendered polypropylene tapes.

Alternatively, the electrostatic shields (107) and (109) and the electric insulation layer (108) may be obtained by extruding and optionally cross-linking ethylene-propylene rubber (EPR) or polyethylene (XLPE).

In addition, the superconducting cable (100) comprises an external metallic shield (not illustrated) made, for example, of copper tapes and in contact with the second electrostatic shield (109). This external metallic shield is earth connected so as its electric potential and that of the shield (109) are null.

Other protecting layer(s) (not illustrated) may be externally provided for minimising any kind of stress for the cable at the moment of the installation.

Figure 4:
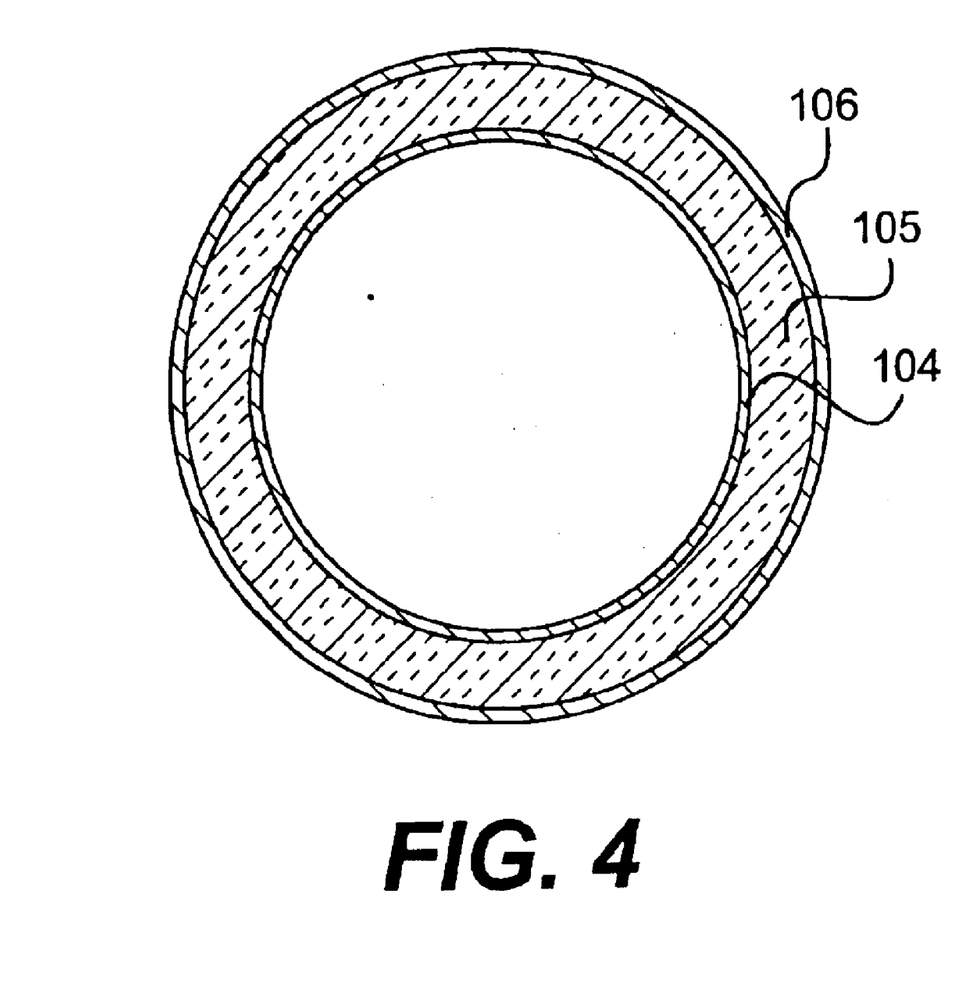
FIG. 4 shows a transversal section of a cryostat of the WD superconducting cable of FIG. 1A.
Figure 5:
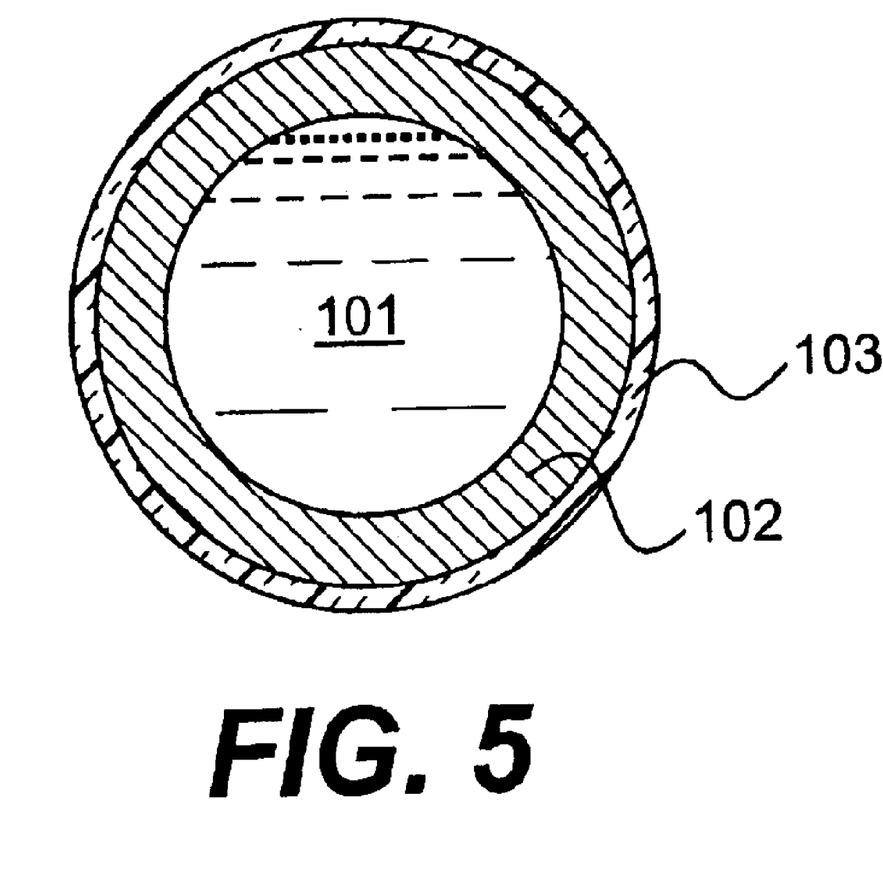
FIG. 5 shows a transversal section of a phase conductor, support, and pipe of the WD superconducting cable of FIG. 1A.
Figure 6:
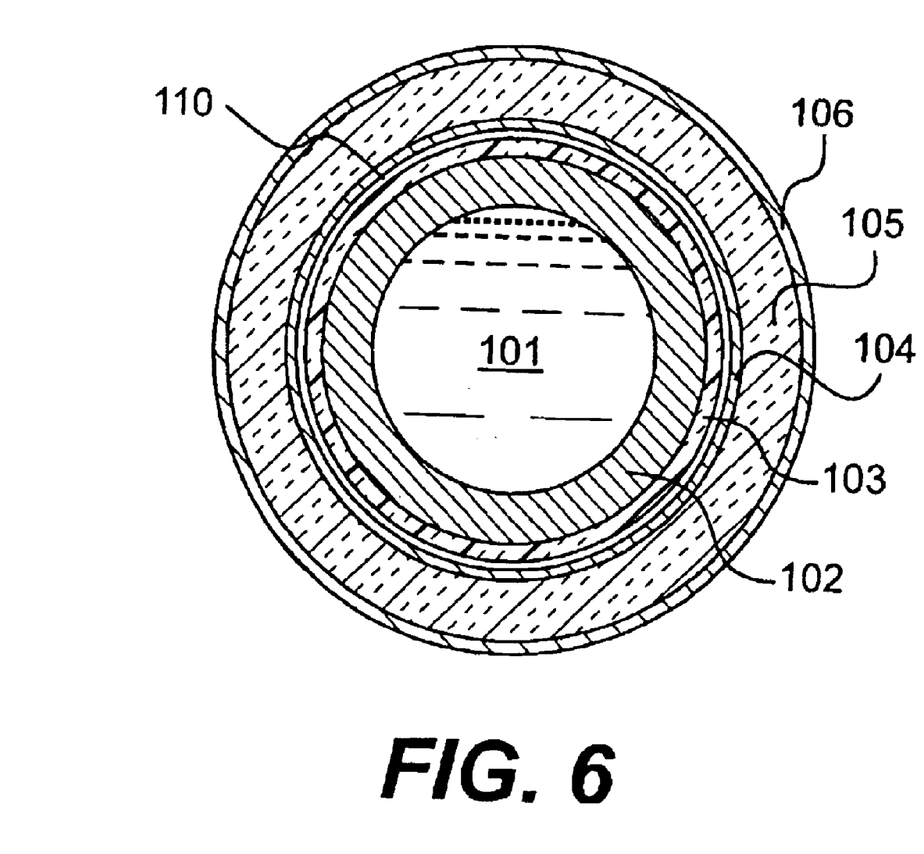
FIG. 6 shows a transversal section of the cryostat, phase conductor, support, and pipe of the WD superconducting cable of FIG. 1A.

FIGS. 4–6 are associated with the WD superconducting cable according to the invention shown in FIG. 1A. In particular, FIG. 4 shows a transversal section of a cryostat of the WD superconducting cable of FIG. 1A; FIG. 5 shows a transversal section of a phase conductor, support, and pipe of the WD superconducting cable of FIG. 1A; and FIG. 6 shows a transversal section of the cryostat, phase conductor, support, and pipe of the WD superconducting cable of FIG. 1A.

Figure 2:
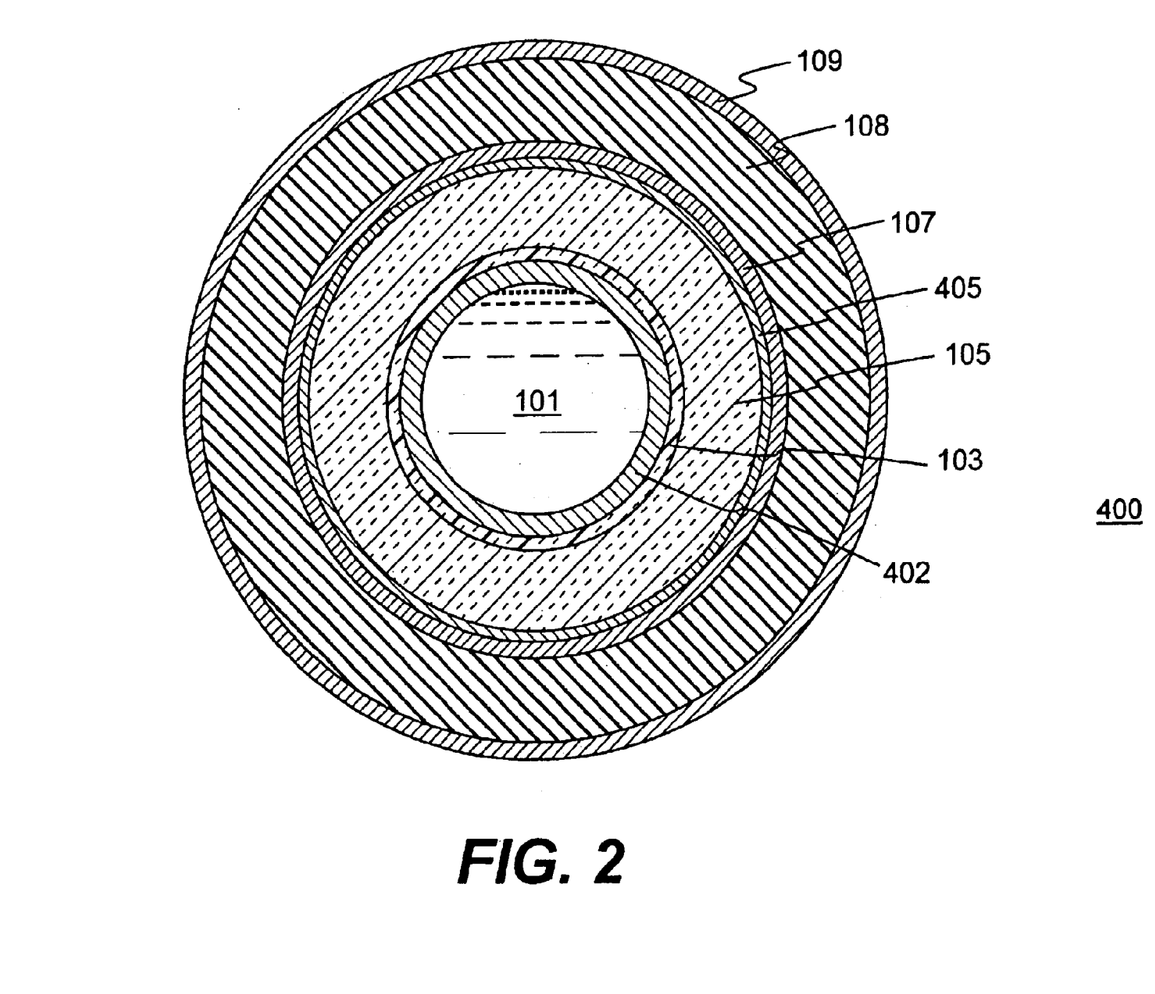
FIG. 2 shows a transversal section of another WD superconducting cable according to the invention.

FIG. 2 shows a section of another WD superconducting cable (400) according to the invention.

The elements of cable (400) that are analogous to the elements of cable (100) of FIGS. 1A and 1B, above are indicated with the same reference numbers, and no further description thereof is provided.

The superconducting cable (400) is provided with a cryostat comprising a first metal tube (402), a thermal insulation (105) and a second metal tube (405).

The first metal tube (402) defines an inner channel (101) wherein the cryogenic fluid flows and, furthermore, performs the function of impervious layer supporting the superconducting tapes. These are housed between such tube (402) and the thermal insulation (105). Accordingly they share the same space of said insulation, i.e. they are under vacuum and not in contact with the cryogenic fluid.

EXAMPLE 1

WD cable (100) with extruded electric insulation (108).

A cable was designed with the following features and performances:

Voltage (phase-phase): 24 kV;
Capacity: 120 MVA;
Phase current: 2890 A.

The designed cable was also suitable for bearing a short circuit with the following values:

Short circuit current: 15000 A;
Duration of the short circuit: 0.1 s.

The cryogenic fluid used is liquid nitrogen.

The length of refrigeration, i.e. the distance between two successive stations of refrigeration for the liquid nitrogen, is fixed at a value of about 200 m.

The diameter of the refrigeration channel (101) is 19 mm.

An impervious layer (102) comprises a 8 mm wide and 1 mm thick aluminium tape coil inserted into a 1 mm thick copper pipe. The impervious layer (102) has an external diameter of 23 mm.

4 layers of conductive tapes were wound on this impervious layer (102), each of them comprising 14 tapes applied with an angle of 30°, for a total of 56 conductive tapes. The phase conductor (103) had an external diameter of 26 mm.

The support/tapes assembly was stabilised against the short circuit, guaranteeing a maximum temperature increase of approximately 5 K calculated in adiabatic conditions.

The first metal tube (104) of the cryostat was made with a 0.6 mm thick stainless steel corrugated pipe, with internal diameter of 27 mm and a corrugation depth of 1.5 mm. Said tube had therefore an external diameter of 27 mm+2·0.6 mm+2·1.5 mm=31.2 mm.

The thermal insulation (105) was made of 50 tapes of "super-insulation" and three Teflon™ spacers placed at 120° up to an external diameter of 57.2 mm.

The second metal tube (106) was made from a 0.6 mm thick corrugated pipe of stainless steel, with an internal diameter of 57.2 mm and a corrugation depth of 2.7 mm. Said pipe had therefore an external diameter of 57.2 mm+2·0.6 mm+2·2.7 mm=63.8 mm.

Considering the value of the working voltage of 24 kV, the first electrostatic shield (107), the electric insulation (108) and the second electrostatic shield (109) were obtained from a triple extrusion of EPR (ethylene propylene rubber).

The first electrostatic shield (107) had an external diameter of 65 mm so as to eliminate the corrugations of the metal tube (106) below and hence regularize the electric field.

The electric insulation (108) was 5.5 mm thick in accordance with the provisions of the International standard for cables with extruded insulation (International Electrotechnique Commission IEC 502), and had an external diameter of 76 mm.

The second electrostatic shield (109) was 1.5 mm thick and has an external diameter of 79 mm.

This cable also comprised an external metal shield (not shown) made of 0.1 mm thick copper tapes and had an external protective layer made of a 3.8 mm thick polyethylene extrusion, again in accordance with the standard IEC 502.

The external diameter of the cable was therefore 86.8 mm.

The feed pressure value for the cryogenic fluid was 18 kg/cm$^2$.

Such a pressure exerted on the metal copper pipe caused a corresponding stress at a pressure of approximately 2 kg/mm$^2$.

The pressure value is considerably lower than the elastic limit of the copper at the temperature of 77 K, which is equal to 9 kg/mm$^2$.

The installation provided for the cable (100) was inside concrete pipes having an internal diameter of about 100 mm. The installation procedure provided appropriate pulling heads placed on the cable. A metal wire rope was pre-inserted in the concrete pipes and restrained to the cable pulling head which was wound on a reel and placed at one end of the connection. At the opposite end of the connection a pulling machine supplied the force necessary for inserting the cable in the pipe. The pulling head ensured both congruity between the various elements of the cable, preventing relative movements from occurring between them and imposed that all the force be absorbed by the two metal pipes of the cryostat.

The Applicant carried out the experiments described in the following Example 2 in order to evaluate whether the dimensioning described above complies with the mechanical requirements provided for a typical plant for distribution of electrical energy and with the needs of transport and installation.

EXAMPLE 2

A cable about 30 m long was produced according to Example 1.

The cable was then subjected to cycles of bending, simulating the mechanical stresses to which the cable is subjected during the phases of transport and installation.

At the end of this cycle, the elements forming the cable were found intact.

Moreover the performances of the three fundamental elements of the superconductor cable, i.e. the conductive tapes and the electric insulation, after the aforesaid mechanical stresses were evaluated.

The critical current $I_c$ of the phase conductor was measured and the resulting value was approximately $I_c$=5600 A. This confirmed the current transport capacity.

As regards the cryostat, the heat losses were measured by making the cryogenic fluid flow in the refrigeration channel and measuring the increase in its temperature. It was found that these losses remained within the design limits.

Finally, as regards the electric insulation, two voltage tests were performed as prescribed by the standards IEC 502.

The first test was carried out by bringing the phase conductor (103) to a test voltage of 30 kV while the external metal copper screen was connected to the earth. The duration of the test was 5 minutes.

The second test was performed by applying impulse voltage stresses to the conductor while the metal screen was connected to the earth.

The impulse voltage level was 125 kV and 10 impulses were applied with positive polarity and 10 impulses with negative polarity.

At the end of the two tests, the electric insulation (108) showed no failure.

Moreover the experiments described above enabled the minimum bending diameter for the cable of Example 1 to be determined, which was fixed at 2 m.

This value is compatible with the typical conditions of installation.

EXAMPLE 3

Thermal radial distribution for a conductor phase comprising more layers of superconducting tape of a WD conducting cable (100)

A thermal model of the conductor, which adopts the so-called electric analogy, known in the field was elaborated.

By following this approach, a thermal system to be studied was assimilated to an electric system consisting of the same number of nodes as the surfaces of separation of the bodies of the system, each at a level of potential which represents the corresponding temperature value in the real system.

Resistors whose resistance value depends on the way in which heat exchange takes place connected the various nodes.

The extent of the heat flow Q exchanged between bodies at a different temperature is equal to the intensity of the current flowing between the two corresponding nodes of the equivalent electric net, and is calculated with the following equation:

$$Q = \Delta T/R \quad (1)$$

wherein R represents the thermal resistances and contains all the details of the exchange of heat between the two bodies.

On the basis of this model, as will be explained hereinbelow, there were established a vector of the electrical resistances $\underline{R}_{term}$, a vector of the heat flows $\underline{flux}$, a vector of the temperature differences $\underline{\Delta T}$ and a matrix equation:

$$\underline{\Delta T} = \underline{flux}\ \underline{R}_{term} \quad (2)$$

The radial distribution of temperature was obtained by solving the equation (2) as a function of $\underline{\Delta T}$.

Figure 7:
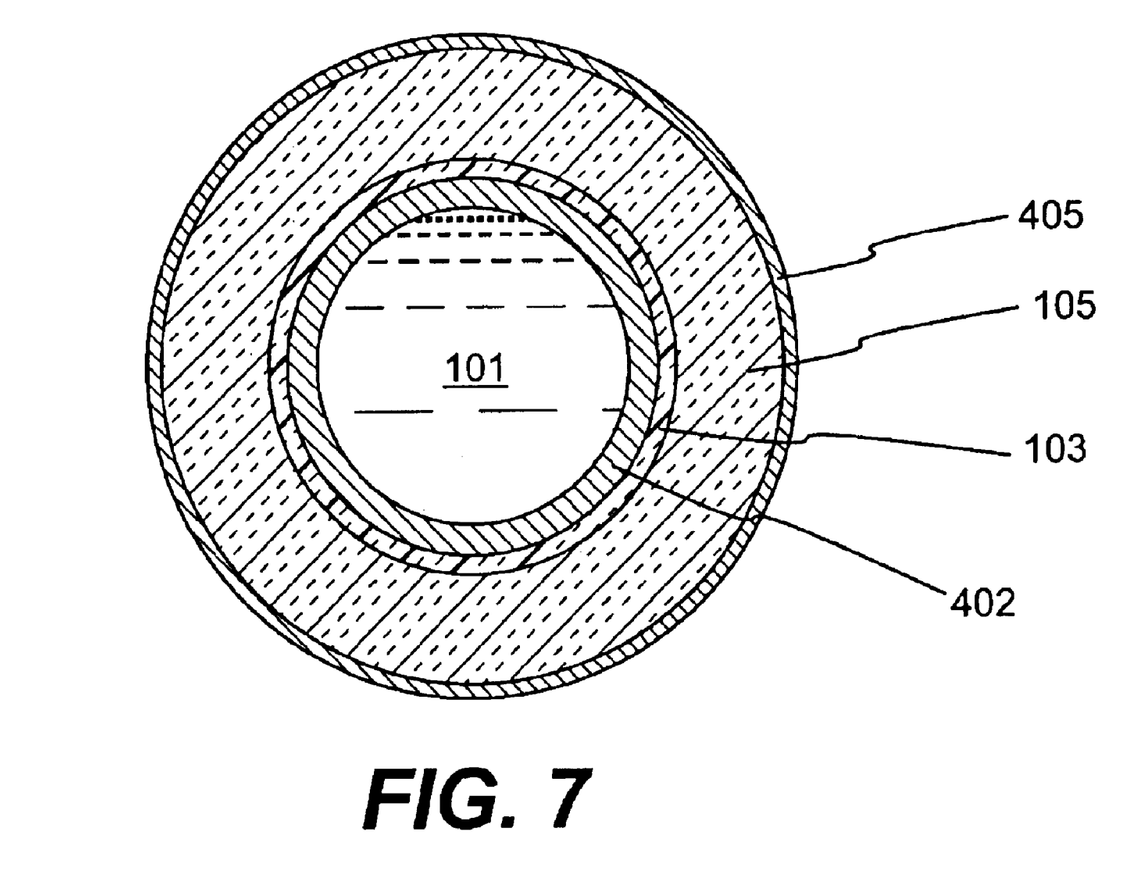
FIG. 7 shows a transversal section of a second metal tube, thermal insulation, phase conductor, first metal tube, and pipe of the WD superconducting cable of FIG. 2.

FIG. 7 is associated with the WD superconducting cable according to the invention shown in FIG. 2. In particular, FIG. 7 shows a transversal section of a second metal tube, thermal insulation, phase conductor, first metal tube, and pipe of the WD superconducting cable of FIG. 2.

Figure 3:
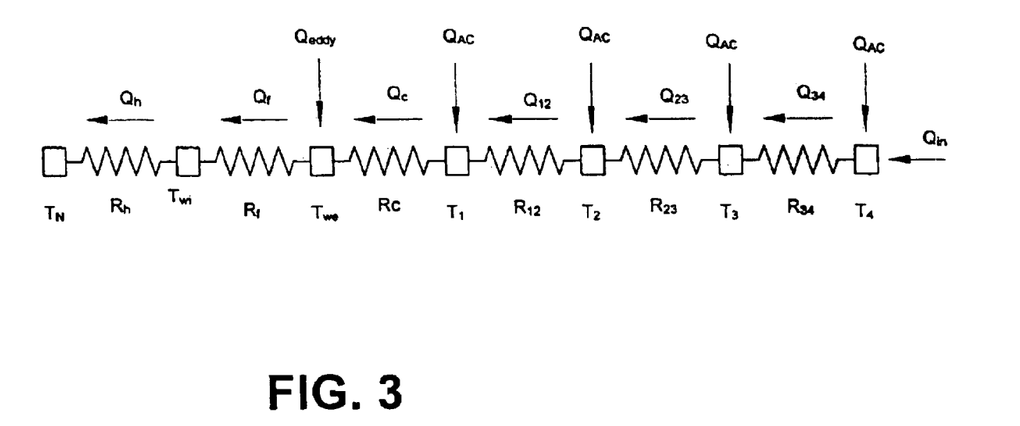
FIG. 3 shows the scheme of the electric analogue of the conductor of a WD cable having four superconducting tapes.

FIG. 3 shows the electrical analogue of a conductor of a WD cable having four conductive tapes. The meaning of each symbol in FIG. 3 and the corresponding units of measurement are indicated in Table 1 below.

TABLE 1

| Symbol | Magnitude | m.u. |
|---|---|---|
| $Q_h$ | Thermal flow liquid nitrogen (LN)/support internal wall | W/m |
| $Q_f$ | Thermal flow through the support | W/m |
| $Q_c$ | Thermal flow support/first superconducting layer | W/m |
| $Q_{ij}$ | $i^{th}/j^{th}$ tape layers thermal flow | W/m |
| $Q_{in}$ | Thermal flow at the most external superconducting tape (sum of cryostat losses, thermal + parasite currents) | W/m |
| $Q_{eddy}$ | losses due to parasite currents in the support | W/m |
| $Q_{AC}$ | AC losses in alternate current for each layer | W/m |
| $R_h$ | Cryogen/support internal wall thermal resistance | K m/W |
| $R_f$ | Support thermal resistance | K m/W |

TABLE 1-continued

| Symbol | Magnitude | m.u. |
|---|---|---|
| $R_c$ | Support/first superconducting tape layer thermal resistance | K m/W |
| $R_{ij}$ | $i^{th}/j^{th}$ tape layers thermal resistance | K m/W |
| $T_N$ | Nitrogen temperature | K |
| $T_{wi}$ | Support internal wall temperature | K |
| $T_{we}$ | Support external wall temperature | K |
| $T_j$ | $j^{th}$ superconducting tape layer temperature | K |

$Q_{eddy}$ represent the thermal flow due to currents induced in the metal structure of the cable.

$Q_{AC}$ represents the thermal flow corresponding to the alternate current (AC) losses generated in the conducting tapes by the magnetic hysteresis, and resulting from a magnetic coupling of the tapes themselves.

The above method was applied to the superconducting cable (100) of FIGS. 1A and 1B, additionally comprising a crepe paper wound around the impervious support (102) and Tyvek™ layers interposed between the superconducting tape layers.

The cryogenic fluid was liquid nitrogen.

Further features of the superconducting cable aspect of the test are set forth the in Table 2.

TABLE 2

| Geometry of the support and of the phase conductor | |
|---|---|
| support internal diameter | 19 mm |
| support external diameter I | 26 mm |
| conductive tape width | 5 mm |
| conductive tape thickness | 0.3 mm |
| number of layers | 4 |
| number of tapes per layer | 14 |
| deposition angle | 25° |
| crepe paper thickness | 0.2 mm |
| tyvek thickness | 0.135 mm |
| Terms of loss (W/m) | |
| cryostat thermal losses | 2.4 |
| internal corrugated eddy losses | 1.62 |
| support eddy losses | 0.54 |
| AC losses for each layer | 1.12 |
| Further parameters | |
| Cryogen flow rate | 0.35 kg/s |
| Copper thermal conductivity | 600 W/m K |
| Crepe paper thermal conductivity | 0.2 W/m K |
| Tyvek thermal conductivity | 0.28 W/m K |

The liquid nitrogen properties were calculated at 15 bar and 75 K.

The column vector $\underline{R}_{term}$, representing the thermal resistance is:

$$Rterm = \begin{pmatrix} R_h \\ R_f \\ R_c \\ R_{12} \\ R_{23} \\ R_{34} \end{pmatrix} = \begin{pmatrix} 4.41 \cdot 10^{-3} \\ 5.07 \cdot 10^{-5} \\ 9.51 \cdot 10^{-3} \\ 2.57 \cdot 10^{-3} \\ 2.46 \cdot 10^{-3} \\ 2.36 \cdot 10^{-3} \end{pmatrix}$$

The vector flux, representing the thermal flow, is $$flux = \begin{pmatrix} Q_h \\ Q_f \\ Q_c \\ Q_{12} \\ Q_{23} \\ Q_{34} \end{pmatrix} = \begin{pmatrix} Q_{in} + 4 \cdot Q_{AC} + Q_{eddy} \\ Q_{in} + 4 \cdot Q_{AC} + Q_{eddy} \\ Q_{in} + 4 \cdot Q_{AC} \\ Q_{in} + 3 \cdot Q_{AC} \\ Q_{in} + 2 \cdot Q_{AC} \\ Q_{in} + Q_{AC} \end{pmatrix} = \begin{pmatrix} 9.0 \\ 9.0 \\ 8.5 \\ 7.4 \\ 6.3 \\ 5.1 \end{pmatrix}$$

The $\Delta T_{(n)}$ temperature differences vector $\underline{\Delta T}$, i.e. the vector whose elements are the differences in temperature between two contiguous components of the cable in question, is $$\Delta T = \begin{pmatrix} T_{wi} - T_N \\ T_{we} - T_{wi} \\ T_1 - T_{we} \\ T_2 - T_1 \\ T_3 - T_2 \\ T_4 - T_3 \end{pmatrix}$$

From the equation (2) above, the following was obtained:

$$\Delta T = \begin{pmatrix} 0.04 \\ 4.6 \cdot 10^{-4} \\ 0.08 \\ 0.019 \\ 0.015 \\ 0.012 \end{pmatrix} \quad (3)$$

The difference in temperature between the tapes of the fourth layer and the cryogen resulted from the following:

$$T_4 - T_N = \sum_n \Delta T_{(n)} = 0.17 \; K$$

The value resulting from the above equation was indicative for an effective cooling for all of the four superconducting tape layers.

The test was repeated on another cable (100) differing from the previously employed in that the impervious support (102) was made of Teflon™. The only parameter changing is the thermal conductivity of such layer, which is 2 W/m K in the place of 600 W/m K of the copper.

With this assumption $$T_4 - T_N = \sum_n \Delta T_{(n)} = 0.3 \; K$$

This value is indicatory of an effective cooling for all of the four superconducting tape layers.

EXAMPLE 4

The behavior in liquid nitrogen of two groups of ten composite conducting tapes each, about 1 m long, made of silver/BSCCO according to the OPIT technology, was evaluated.

The tapes of the first group were produced by the American Superconductor Corporation (USA), model No. OX986, while those of the second group were model No. 2083A1 of the same company. The tape of the second group were applied with steel laminae onto the larger opposite surfaces along the entire length, according to the teaching of the above mentioned WO 98/09004.

All the tapes were sealed at both ends with silicon or metal alloy, and placed in a liquid nitrogen bath at 77 K, under atmospheric pressure, so as to make their ends remaining outside of the bath.

After two weeks of immersion, the tapes were observed outside of the bath at room temperature. Blisters were found along the entire length, varying from millimeters to several centimeters.

The blisters were due to the penetration of liquid nitrogen through micro fractures of local defects on the surface of the silver. Also in the case of the second group of tapes blisters were found due to the diffusion of the liquid through the surfaces not covered by the steel lamina.

When the so penetrated liquid nitrogen passes into the gaseous state because of an increasing of temperature, the time required for this status transition is less that that required for diffusing outside of the tape material. The overpressure due to the volume increase of the status transition causes the formation of the blisters.

Such blisters may lead to a partial or total destruction of the superconducting filaments. Moreover, the mechanical deformation of a tape may also cause damage to adjacent tapes.

These damages are associated with a significant reduction or even to the interruption of the current transport capacity.

Repeated cycles of immersion and extraction of the tapes led to a directly proportional formation of blisters and decreasing capacity of current transport.

EXAMPLE 5

The performances of the same two kinds of tapes of Example 5 were evaluated for shorter immersion duration in liquid nitrogen under overpressure.

The immersion took place at 77 K, under 5 atm for about 270 minutes.

At the end of the test, the conductive tapes, observed at room temperature, showed blisters similar to those of the Example 4.

What is claimed is:

1. A superconducting cable, comprising:
   a cryostat;
   a superconducting conductor;
   a thermal conductor; and
   a channel;
   wherein the cryostat comprises thermal insulation,
   wherein the superconducting conductor is disposed internal to the thermal insulation,
   wherein the thermal conductor is disposed internal to the superconducting conductor,
   wherein the thermal conductor is impervious to cryogenic fluid, and
   wherein the channel is disposed internal to the thermal conductor.

2. The superconducting cable of claim 1, further comprising electrical insulation.

3. The superconducting cable of claim 1, further comprising electrostatic shielding.

4. The superconducting cable of claim 1, wherein the superconducting cable is a warm dielectric cable.

5. The superconducting cable of claim 1, further comprising a second superconducting conductor.

6. The superconducting cable of claim 1, wherein the superconducting cable is a cold dielectric cable.

7. The superconducting cable of claim 1, wherein the thermal conductor comprises material comprising a thermal conductivity greater than 1 W/m-° K at 70° K.

8. The superconducting cable of claim 1, wherein the thermal conductor comprises material comprising a thermal conductivity greater than or equal to 2 W/m-° K at 70° K.

9. The superconducting cable of claim 1, wherein the thermal conductor comprises a metal, a polymeric substance, or a combination of a metal and a polymeric substance.

10. The superconducting cable of claim 9, wherein the metal is aluminum, copper, or steel.

11. The superconducting cable of claim 9, wherein the polymeric substance is a fluorinated polyolefin, a polyamide, or a polyolefin.

12. The superconducting cable of claim 9, wherein the polymeric substance is polytetrafluoroethylene.

13. The superconducting cable of claim 1, wherein the thermal conductor is tubular in form.

14. The superconducting cable of claim 1, wherein the thermal conductor comprises an inner diameter greater than about 10 mm and less than about 50 mm.

15. The superconducting cable of claim 1, wherein the superconducting conductor comprises oxides of bismuth, calcium, copper, and strontium.

16. The superconducting cable of claim 1, wherein the superconducting conductor comprises oxides of bismuth, calcium, copper, lead, and strontium.

17. The superconducting cable of claim 1, wherein the superconducting conductor comprises oxides of barium, copper, and one or more of europium, gadolinium, neodymium, samarium, and yttrium.

18. The superconducting cable of claim 1, wherein the superconducting conductor comprises oxides of calcium, copper, mercury, and one or both of barium and strontium.

19. The superconducting cable of claim 1, wherein the superconducting conductor comprises oxides of calcium, copper, thallium, and one or both of barium and strontium.

20. The superconducting cable of claim 1, wherein the superconducting conductor comprises oxides of copper and one or more of barium, lanthanum, and strontium.

21. The superconducting cable of claim 1, wherein the superconducting conductor comprises oxides of copper, lead, strontium, and yttrium.

22. The superconducting cable of claim 1, wherein the superconducting cable further comprises a getter device.

23. The superconducting cable of claim 1, wherein the superconducting cable further comprises getters.

24. The superconducting cable of claim 1, further comprising:
a chamber;
wherein the cryostat further comprises a first tube and a second tube,
wherein the thermal insulation is disposed between the first and second tubes,
wherein the superconducting conductor is disposed internal to the cryostat,
wherein the chamber is disposed between the cryostat and the superconducting conductor, and
wherein the chamber is substantially free from fluids that liquefy at a temperature greater than or equal to an operative temperature of the superconducting cable.

25. The superconducting cable of claim 24, wherein the chamber is under vacuum.

26. The superconducting cable of claim 25, wherein a minimum value of the vacuum is at least $1\times10^{-4}$ bar.

27. The superconducting cable of claim 25, wherein a minimum value of the vacuum is at least $1\times10^{-7}$ bar.

28. The superconducting cable of claim 25, wherein the superconducting cable further comprises a getter device.

29. The superconducting cable of claim 25, wherein the superconducting cable further comprises getters.

30. The superconducting cable of claim 24, wherein the chamber contains helium.

31. The superconducting cable of claim 1, wherein the cryostat further comprises a tube, and
wherein the thermal insulation is internal to the tube.

32. A superconducting cable, comprising:
a cryostat;
a superconducting conductor;
a thermal conductor;
a channel; and
a cryogenic fluid;
wherein the cryostat comprises thermal insulation,
wherein the superconducting conductor is disposed internal to the thermal insulation,
wherein the thermal conductor is disposed internal to the superconducting conductor,
wherein the thermal conductor is impervious to the cryogenic fluid,
wherein the channel is disposed internal to the thermal conductor, and
wherein the cryogenic fluid flows in the channel.

33. The superconducting cable of claim 32, further comprising electrical insulation.

34. The superconducting cable of claim 32, further comprising electrostatic shielding.

35. The superconducting cable of claim 32, wherein the superconducting cable is a warm dielectric cable.

36. The superconducting cable of claim 32, further comprising a second superconducting conductor.

37. The superconducting cable of claim 32, wherein the superconducting cable is a cold dielectric cable.

38. The superconducting cable of claim 32, wherein the thermal conductor comprises material comprising a thermal conductivity greater than 1 W/m-° K at 70° K.

39. The superconducting cable of claim 32, wherein the thermal conductor comprises material comprising a thermal conductivity greater than or equal to 2 W/m-° K at 70° K.

40. The superconducting cable of claim 32, wherein the thermal conductor comprises a metal, a polymeric substance, or a combination of a metal and a polymeric substance.

41. The superconducting cable of claim 40, wherein the metal is aluminum, copper, or steel.

42. The superconducting cable of claim 40, wherein the polymeric substance is a fluorinated polyolefin, a polyamide, or a polyolefin.

43. The superconducting cable of claim 40, wherein the polymeric substance is polytetrafluoroethylene.

44. The superconducting cable of claim 32, wherein the thermal conductor is tubular in form.

45. The superconducting cable of claim 32, wherein the thermal conductor comprises an inner diameter greater than about 10 mm and less than about 50 mm.

46. The superconducting cable of claim 32, wherein the superconducting conductor comprises oxides of bismuth, calcium, copper, and strontium.

47. The superconducting cable of claim 32, wherein the superconducting conductor comprises oxides of bismuth, calcium, copper, lead, and strontium.

48. The superconducting cable of claim 32, wherein the superconducting conductor comprises oxides of barium, copper, and one or more of europium, gadolinium, neodymium, samarium, and yttrium.

49. The superconducting cable of claim 32, wherein the superconducting conductor comprises oxides of calcium, copper, mercury, and one or both of barium and strontium.

50. The superconducting cable of claim 32, wherein the superconducting conductor comprises oxides of calcium, copper, thallium, and one or both of barium and strontium.

51. The superconducting cable of claim 32, wherein the superconducting conductor comprises oxides of copper and one or more of barium, lanthanum, and strontium.

52. The superconducting cable of claim 32, wherein the superconducting conductor comprises oxides of copper, lead, strontium, and yttrium.

53. The superconducting cable of claim 32, wherein the superconducting cable further comprises a getter device.

54. The superconducting cable of claim 32, wherein the superconducting cable further comprises getters.

55. The superconducting cable of claim 32, wherein the cryogenic fluid comprises a transition temperature from a liquid state to a gaseous state greater than a critical temperature of a material of the superconducting conductor.

56. The superconducting cable of claim 32, wherein the cryogenic fluid comprises one or more of liquid argon, liquid helium, liquid hydrogen, and liquid nitrogen.

57. The superconducting cable of claim 32, wherein the cryogenic fluid is liquid nitrogen.

58. The superconducting cable of claim 32, wherein a temperature of the cryogenic fluid is greater than about 65° K and less than about 90° K.

59. The superconducting cable of claim 32, further comprising:
   a chamber;
   wherein the cryostat further comprises a first tube and a second tube,
   wherein the thermal insulation is disposed between the first and second tubes,
   wherein the superconducting conductor is disposed internal to the cryostat,
   wherein the chamber is disposed between the cryostat and the superconducting conductor, and
   wherein the chamber is substantially free from fluids that liquefy at a temperature greater than or equal to an operative temperature of the superconducting cable.

60. The superconducting cable of claim 59, wherein the chamber is under vacuum.

61. The superconducting cable of claim 60, wherein a minimum value of the vacuum is at least $1\times10^{-4}$ bar.

62. The superconducting cable of claim 60, wherein a minimum value of the vacuum is at least $1\times10^{-7}$ bar.

63. The superconducting cable of claim 60, wherein the superconducting cable further comprises a getter device.

64. The superconducting cable of claim 60, wherein the superconducting cable further comprises getters.

65. The superconducting cable of claim 59, wherein the cryogenic fluid comprises a transition temperature from a liquid state to a gaseous state greater than a critical temperature of a material of the superconducting conductor.

66. The superconducting cable of claim 59, wherein the cryogenic fluid comprises one or more of liquid argon, liquid helium, liquid hydrogen, and liquid nitrogen.

67. The superconducting cable of claim 59, wherein the cryogenic fluid is liquid nitrogen.

68. The superconducting cable of claim 59, wherein a temperature of the cryogenic fluid is greater than about 65° K and less than about 90° K.

69. The superconducting cable of claim 59, wherein the chamber contains helium.

70. The superconducting cable of claim 32, wherein the cryostat further comprises a tube, and
   wherein the thermal insulation is internal to the tube.

* * * * *